July 9, 1968     D. R. LOCKE ETAL     3,392,365

BATTERY HOLDER AND CONTACT ASSEMBLY

Original Filed Jan. 12, 1962     3 Sheets-Sheet 1

INVENTORS
DAVID R. LOCKE
RONALD B. WUENNEMANN
ROBERT J. TOLMIE

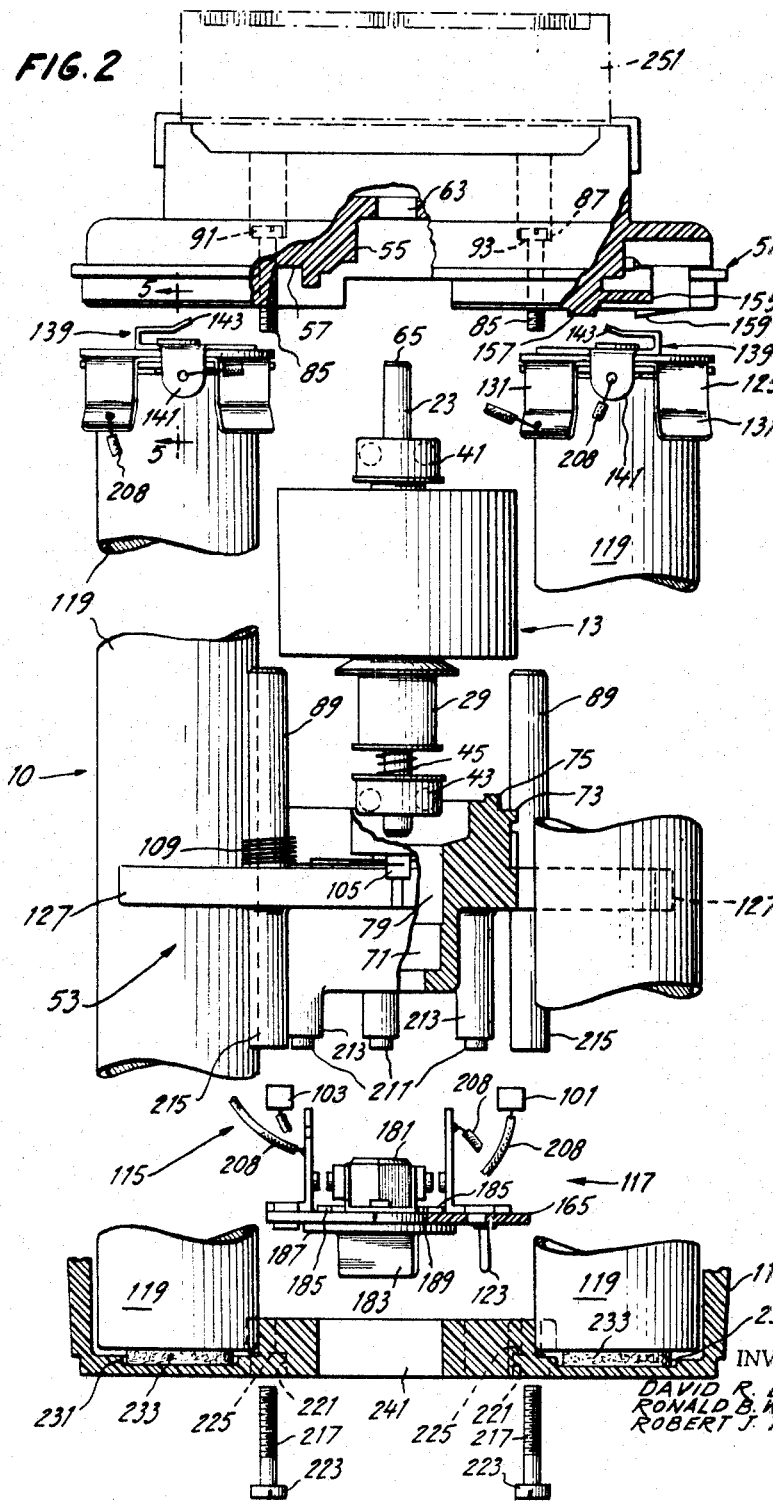

July 9, 1968  D. R. LOCKE ET AL  3,392,365
BATTERY HOLDER AND CONTACT ASSEMBLY
Original Filed Jan. 12, 1962  3 Sheets-Sheet 3
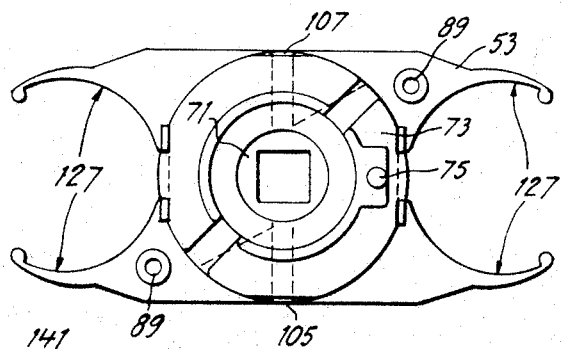
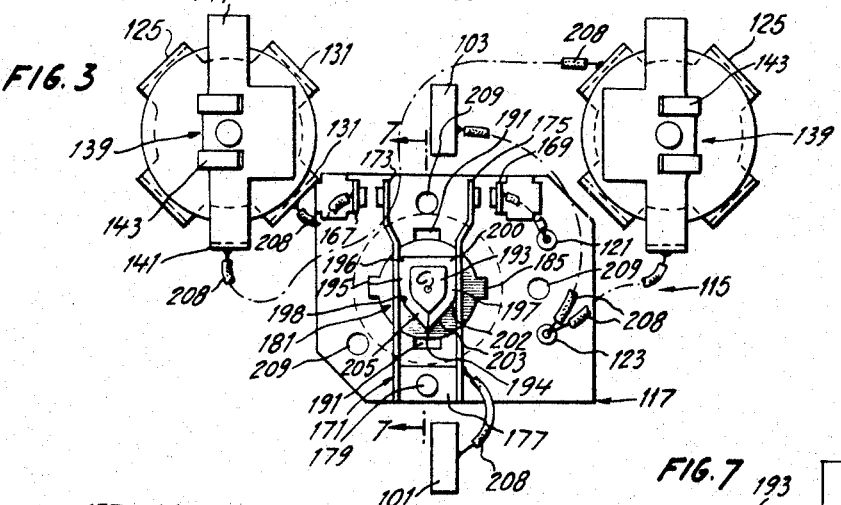
INVENTORS.
DAVID R. LOCKE
RONALD B. WUENNEMANN
ROBERT J. TOLMIE United States Patent Office 3,392,365
Patented July 9, 1968

3,392,365
BATTERY HOLDER AND CONTACT ASSEMBLY
David R. Locke, Bridgeport, and Ronald B. Wuennemann and Robert J. Tolmie, Fairfield, Conn., assignors to Sperry Rand Corporation, New York N.Y. a corporation of Delaware
Original application Jan. 12, 1962, Ser. No. 165,819, now Patent No. 3,255,435, dated June 7, 1966. Divided and this application Oct. 21, 1965, Ser. No. 513,886
2 Claims. (Cl. 339—119)

ABSTRACT OF THE DISCLOSURE

This disclosure is directed to a battery holder and contact assembly including first and second contact means adapted to engage the input and output terminals of a battery wherein one of the contact means is provided with spring type gripping means for holding the battery in engagement with both contact means and the other said contact means is provided with portions for frictionally securing the assembly as a unit to a support member.

---

This invention relates to a battery holder and contact means assembly for a portable battery operated electrical appliance and is a division of application of Ser. No. 165,819 filed Jan. 12, 1962 and now U.S. Patent No. 3,255,435.

Portable motor operated electrical appliances and power tools which have a self-contained power source inherently must possess the characteristic of compactness in order to be of maximum use to the purchaser or user. Compactness of a product generally results in manifold problems of manufacture and assembly which in turn are reflected in the price and/or the servicing of the product. Since portable appliances and tools of this type are sold to the public generally rather than only to a restricted group or class, such as industrial users, price and service become major considerations to the manufacturer of such products.

An object of this invention is to provide a novel battery holder assembly for an electrical appliance.

A still further object is to provide a novel battery holder assembly having a battery holding element which also serves as a contact for one of the battery terminals.

Other objects and advantages of the invention, in its details of construction and arrangement of parts, will be apparent from a consideration of the following specification and accompanying drawings wherein:

FIG. 2 is an exploded, elevational view of the device shown in FIG. 1;

FIG. 3 is a plan view of the electrical assembly;

FIG. 4 is a plan view of the upper surface of the lower end-bell;

FIG. 6 is a sectional plan view of the end of an upper end-bell showing the battery holder assembly positioned thereon;

FIG. 7 is a sectional view of the switch taken along lines 7—7 of FIG. 3, and

FIG. 8 is a partial view of the bottom of the assembled device.

Figure 1:
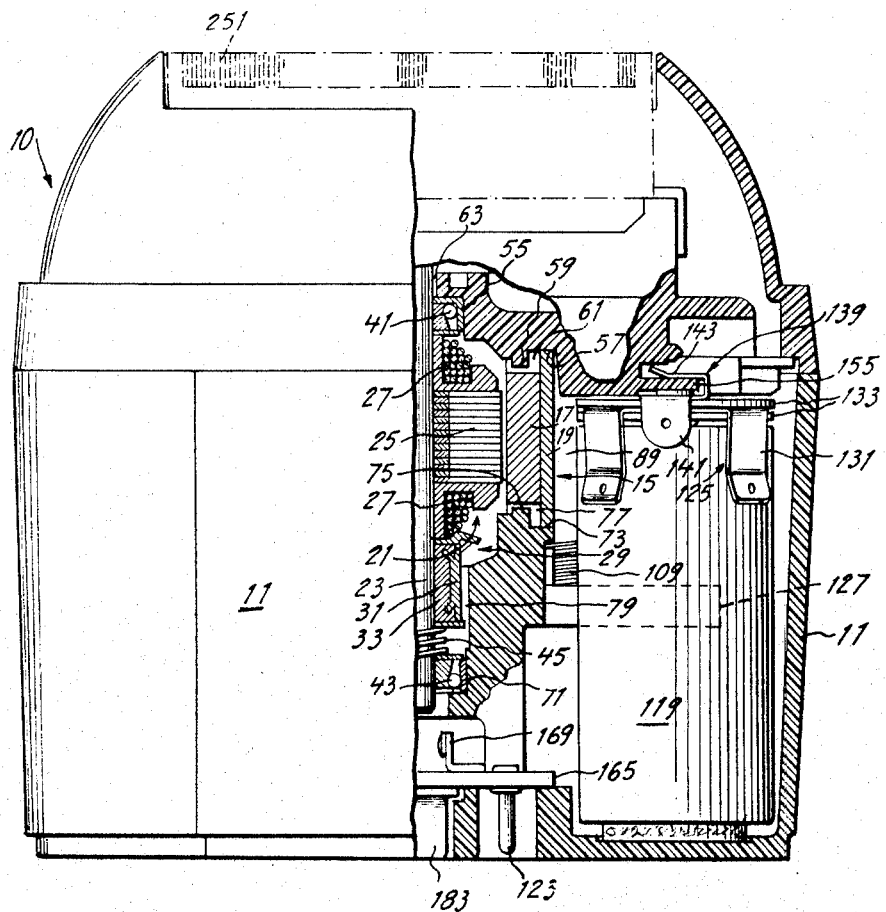
FIG. 1 is an elevational view of a battery operated appliance with a portion thereof in section and which appliance embodies the present invention.
Figure 5:
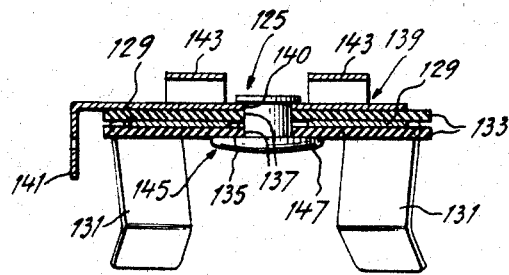
FIG. 5 is an elevational view in partial section of the battery holder assembly.

Referring now to the drawings for a more detailed description of the present invention an embodiment thereof is incorporated in an electric dry shaver generally designated by the numeral 10. It should be understood however, that the hereinafter described application of the invention to an electric shaver is for purposes of illustration only inasmuch as the subject invention finds ready application to many different electrical appliances or power tools which are motor operated. A casing 11 of electric shaver 10 houses a low voltage DC motor assembly 13. The motor assembly 13 may be of any suitable type as long as it conforms to the power requirements and size restrictions of the particular appliance or power tool.

In the preferred embodiment the motor assembly 13 utilizes a cylindrical stator 15 (FIG. 1) which comprises an inner cylindrical field member 17 and an outer split ring 19, interconnected by a key and slot (not shown) to prevent relative rotation. An armature 21 has a shaft 23 upon which is mounted a laminated body 25 with coil windings 27. The coil windings 27 are electrically connected to a commutator 29 formed of a plural electrically insulated conductive segments 31 set in a molded plastic body 33.

The motor assembly 13 is mounted for rotation in upper bearing assembly 41 and lower bearing assembly 43. A spring 45 is mounted on armature shaft 23 between commutator 29 and lower bearing assembly 43 to bias the shaft in the direction of bearing assembly 41.

The motor assembly 13 and bearing assemblies 41 and 43 are seated in an upper end-bell 51 and a lower end-bell 53. The upper end-bell 51 has integrally formed therein a bearing seat 55 and a stator seat 57. The stator seat 57 is further provided with a key 59 adapted for seating in a slot 61 of tubular stator 15 to prevent rotational movement of the tubular stator 15 with respect to the end-bells 51 and 53. The upper end-bell 51 also has an aperture 63 for receiving the end 65 of armature shaft 23.

The lower end-bell has integrally formed therein a bearing seat 71, and a stator seat 73. The stator seat 73 is further provided with a key 75 adapted for seating in a slot 77 of tubular stator 15 to prevent rotational movement of the tubular stator 15 with respect to the end-bells 51 and 53. The lower end-bell 53 is provided with a commutator recess 79.

Upper end-bell 51 and lower end-bell 53 are secured together by two threaded members 85 (FIGS. 1 and 2) which are accommodated within apertures 87 (FIG. 2) formed in the upper end-bell 51. The threaded portions of members 85 are threaded into posts 89, integrally formed on the lower end-bell 53, until a head 91 of the threaded member 85 abuts against a shoulder 93 formed in the upper end-bell 51. Posts 89 also serve to space the upper end-bell 51 from the lower end-bell 53 when assembled. The posts 89 may either be internally threaded or provided with apertures having smooth walls whereby the threaded members are of the self tapping variety. The upper end-bell 51 and lower end-bell 53 are preferably formed of a material having non-magnetic and non-conductive properties such as plastic.

The motor assembly 13 receives its electrical energy through brushes 101 and 103 (FIG. 3) which engage commutator 29 and are slidably disposed in passageways 105 and 107 (FIG. 4) in lower end-bell 53. Springs 109 (FIGS. 1 and 2) are mounted on the posts 89 of the lower end-bell 53 and bias the brushes 101 and 103 into engagement with the commutator 29.

Brushes 101 and 103 are part of an electrical assembly 115. The electrical assembly 115 provides a switch 117 for selectively interconnecting the brushes 101 and 103 to either a self-contained source of power as for example batteries 119 or to an external D.C. source through terminals 121 and 123.

The batteries 119 are held in place by battery holder assemblies 125 and resilient arms 127 integrally formed on the lower end-bell 53. The battery holder assembly 125 serves the dual function of positioning the battery and making contact with the battery terminals. To accomplish this a battery holder 129 (FIG. 3) of electrically conductive material has formed thereon leaf spring gripping means comprising prongs 131 adapted to firmly grasp a battery therebetween. An aperture 135 is formed in the battery holder and positioned above and below the latter are two insulators 133. The two insulators 133 are provided with center apertures 137 which are of smaller diameter than the aperture 135 formed in the center of the battery holder 129.

A terminal clip 139 having terminal portions 141 and spring clip portions 143 is positioned above the insulators 133 and battery holder 129. The terminal clip 139 has an aperture 140 formed therein. A rivet 145 with its head 147 positioned below the lower insulator 133, is inserted into the apertures 135, 137 and 140 with the center of the rivet 145 and apertures 135, 137 and 140 aligned. The small diameter of the apertures 137 in the insulators 133 will space the rivet 145 from the battery holder 129. The rivet is peened over against terminal clip 139 interconnecting the rivet 145, battery holder 129, insulators 133 and terminal clip 139 to provide a secure assembly.

The battery holder assembly 125 is constructed to be used with a battery 119 of the cylindrical type. The battery has a cap on the top thereof serving as one terminal. The sides of the battery serve as the second terminal. When seated in the battery holder assembly 125 the cap of the battery contacts the rivet 145 and the sides of the battery are in contact with prongs 131.

A ledge 155 and retaining lugs 157, 159 (FIGS. 2 and 6) are integrally formed on upper end-bell 51 and serve to position the battery holder assembly 125. The retaining lugs are spaced apart a distance equal to the longitudinal dimension of terminal portion 141 (as seen in FIG. 6) of the terminal clip 139. Retaining lugs 159 are cam or wedge shaped (FIG. 2) to spread the spring portion 143 of the terminal clip 139 to facilitate attachment of the battery holder assembly 125 to the upper end-bell 51.

The terminals 121, 123 are mounted on a terminal board 165 of an electrically non-conductive material. Also mounted on terminal board 165 are stationary contacts 167, 169 (FIG. 3) and a movable contact 171. The movable contact 171 has two spaced leaf spring contact arms 173, 175 interconnected at one end by a conductive member 177 and conductive member 177 is secured to the terminal board 165 by a rivet 179, or any other suitable securing means. The movable contact arms 173, 175 by their construction are biased towards each other.

A contact actuator 181 (FIGS. 2 and 3) is rotatably carried by the terminal board 165 and is positioned between the two leaf spring contact arms 173, 175 to space same and to engage either of said leaf spring contact arms 173, 175 with their respective stationary contacts 167, 169, respectively. The contact actuator 181 has integrally formed therewith a flat piece 183 (FIGS. 1 and 7) which may be manually grasped and turned to rotate contact actuator 181. Actuator 181 has lip members 185 and a flange 187 (FIGS. 3 and 7) formed thereon. The terminal board 165 has an aperture 189 and slots 191 formed therein. With the lip member 185 aligned with the slots 191 the actuator 181 may be inserted up from the bottom of the terminal board 165 until the flange 187 abuts against the bottom of the terminal board 165. A slight rotation will place the lip members 185 on the top surface of the terminal board 165. The lip members 185 and flange 187 coacting with the terminal board 165 will constrain the contact actuator 181 to rotational movement with respect to the terminal board 165.

A cam 193 (FIG. 3) is formed on the upper portion of contact actuator 181 and has a pentagonal configuration which may be considered to include a rectangle and a triangle with a side of the rectangle common with the base of the triangle. An apex 194 of the triangular portion of cam 193 is adjacent securing element 179 when contact actuator 181 is properly set to its center position (FIG. 3) on terminal board 165. In this center position sides 195 and 197 of the rectangular portion of cam 193 are engaged by leaf spring contact arms 173 and 175, respectively. The coaction between the leaf spring contact arms 173 and 175 and sides 195 and 197 detents the cam 193 and thereby contact actuator 181 in the center position (FIG. 3).

Corners 196 and 198 of the rectangular portion of cam 193 engage leaf spring contact arm 173. Corners 200 and 202 of the rectangular portion of cam 193 engage leaf spring contact arm 175. The radial distance of corners 196 and 200 from the center of rotation $c$ of cam 193 is greater than the radial distance of corners 198 and 202 from the center of rotation $c$ of cam 193.

When the contact actuator 181 is rotated counterclockwise from the center position, as seen in FIG. 3, corner 196 will move leaf spring contact arm 173 towards stationary contact 167 and corner 202 will move leaf spring contact arm 175 towards stationary contact 169. The radial distance of corner 196 from the center of rotation $c$ of cam 193 is sufficient to move leaf spring contact 173 into engagement with stationary contact 167. However, the radial distance of corner 202 from the center of rotation $c$ of cam 193 is insufficient to move leaf spring contact 175 into engagement with stationary contact 169. When contact actuator 181 has been rotated (counterclockwise) a sufficient distance, a leg 203 of the triangular portion of cam 193 will be engaged by leaf spring contact arm 175 to detent the contact actuator 181 in its counterclockwise position.

When the contact actuator 181 is rotated clockwise from the center position, as seen in FIG. 3, corner 200 will move leaf spring contact arm 175 towards stationary contact 169 and corner 198 will move leaf spring contact arm 173 towards stationary contact 167. The radial distance of corner 200 from the center of rotation $c$ of cam 193 is sufficient to move leaf spring contact 175 into engagement with stationary contact 169. However, the radial distance of corner 198 from the center of rotation $c$ of cam 193 is insufficient to move leaf spring contact 173 into engagement with stationary contact 167. When contact actuator 181 has been rotated (clockwise) a sufficient distance, a leg 205 of the triangular portion of cam 193 will be engaged by leaf spring contact arm 173 to detent the contact actuator 181 in its clockwise position.

The brushes 101, 103, battery holder assemblies 125 terminals 121, 123, stationary contacts 167, 169 and movable contact 171 are all electrically interconnected by conductive members 208 so that rotation of the contact actuator 181 from its center position in one direction will complete a circuit from the battery holders assemblies 125 to the brushes 101, 103 and the rotation of the contact actuator 181 from its center position in the other direction will complete a circuit from the terminals 121, 123 to the brushes 101, 103. If desired provision may be made for a recharging circuit for the batteries 119.

The terminal board 165 has three apertures 209 formed thereon. The diameter of the apertures 209 is chosen to provide a friction fit between the sides of the apertures 209 and three lugs 211 on the ends of posts 213 of the lower end-bell 53.

Also provided on the lower end-bell 53 are two posts 215. The ends of posts 215 are hollow and receive threaded members 217. The ends of posts 215 may be threaded or not, but if not threaded self-tapping threaded members are used.

The structure described up to this point is accommodated within casing 11 which has formed therein openings 221 through which the threaded portion of threaded members 217 pass when screwed into posts 215. When the heads 223 of threaded members 217 abut against shoulders 225 on the bottom 219 of casing 11 will be securely positioned to house all the assembled components of the device.

Casing 11 has formed therein recesses 231 which position pads 233 attached to the lower ends of batteries 119. The pads 233 are made from a non-conductive resilient substance such as foam rubber. Also formed in the bottom of casing 219 is an aperture 241 (FIGS. 2 and 8) through which flat piece 183 of the contact actuator 181 extends when the device is assembled. A lug 243 is formed on the inner surface of the aperture 241 and includes a pair of shoulders 245, 247 which coact with piece 183 to restrict rotational movement of the contact actuator 181.

A plate 249 is attached to the bottom of the casing by suitable means. The plate 249 has markings thereon to indicate the positions of switch 117. If preferred the markings may be made directly on the surface of casing 219.

Position II corresponds to the center position of contact actuator 181 (FIG. 3), while positions I and III correspond respectively to the counterclockwise and clockwise positions of contact actuator 181 as hereinbefore described with respect to FIG. 3.

To assemble the device the bearing assembly 43 is positioned in its seat 71 on the lower end-bell 53. With spring 45 in place on the armature shaft 23 the motor assembly 13 is placed on the lower end-bell 53. The tubular stator 15 is easily positioned in its seat 73. A slight rotation of the tubular stator 15 may be required to align the key 75 on the lower end-bell 53 with the slot 77 in the tubular stator 15. Springs 109 are placed on posts 89. The bearing assembly 41 is next seated in its seat 55 in the upper end-bell 51 and the upper end-bell 51 is secured to the lower end-bell 53 by use of the two threaded members 85.

The electrical assembly 115, preassembled as a unit, is attached to the upper end-bell 51 by snapping the terminal clips 139 over ledges 155. The retaining lugs 157, 159 positioning the terminal portion 141 therebetween. The terminal board 165 is then snapped onto the posts 213 on the lower end-bell 53. Brushes 101 and 103 are inserted into passageways 105, 107 the springs 109 set to bias the brushes 101, 103 into engagement with the commutator 29.

Each battery 119 is inserted into its battery holder assembly 125 and between the resilient arms 127 on the lower end-bell 53. If the battery 119 should be incorrectly inserted, the pad 233 on the bottom thereof will engage the rivet 147 and thereby provide an open circuit which will prevent damage to the device.

Casing 11 is positioned over the components and secured to posts 215 on the lower end-bell 53 by the use of threaded members 217.

The cutter shaver head 251 is next attached to the upper end-bell 51 and the end 65 of the armature shaft 23. The upper end-bell 51 has the proper structure to accommodate the shaver head. If servicing is required, the casing 11 is removed and the entire operating mechanism is still properly positioned and operable without the casing. This facilitates observation of the various parts while the device is running.

The batteries 119 may be quickly removed and replaced without breaking any solder joints or unscrewing any terminals.

The entire electrical assembly 115 may be removed if required by merely extracting the brushes 101, 103 and removing the battery holder assemblies 125 and terminal board 165.

It is now apparent that the present invention provides a unique assemblage which renders possible easy assembly and disassembly without sacrificing compactness and without a multi-part complicated mounting structure.

It is understood that although we have shown the preferred form of our invention, that various modifications may be made in the details thereof without departing from its spirit as comprehended by the following claims:

What is claimed is:
1. A combination battery holder and contact assembly for a battery having both positive and negative terminal portions, said assembly comprising
   (a) first contact means adapted to engage the positive terminal of a battery,
   (b) second contact means secured to said first contact means and adapted to engage the negative terminal of a battery,
   (c) an insulating member electrically separating said first and second contact means,
   (d) one of said contact means including leaf spring type gripping means formed for frictionally holding a battery in engagement with said first and second contact means, and
   (e) the other of said contact means including a spring type clip having portions shaped to engage a support member to frictionally secure said assembly thereto.
2. The combination battery holder and contact assembly of claim 1, wherein
   (a) said first contact means comprises a rivet of conductive material interconnecting said second contact means and said insulating member, said first contact means further including said spring type clip for frictionally securing said battery holder and contact assembly to a support member, said spring type clip having a portion adapted for connection to an electric wire, and
   (b) wherein said second contact means comprises the leaf spring type gripping means, said gripping means including plural resilient prong members.

References Cited

UNITED STATES PATENTS

| | | | |
|---|---|---|---|
| 983,760 | 2/1911 | Patterson | 339—152 X |
| 2,190,403 | 2/1940 | Foute | 339—119 |
| 2,744,188 | 5/1956 | Olsen et al. | 339—152 X |
| 2,901,526 | 8/1959 | Huntley et al. | 339—152 X |
| 3,181,974 | 5/1965 | Labarbera | 339—152 |

RICHARD E. MOORE, *Primary Examiner.*